Patented Feb. 3, 1942

2,272,047

UNITED STATES PATENT OFFICE 2,272,047

INSECTICIDE

Andrew F. Freeman, Bogalusa, La., assignor to Henry A. Wallace, as Secretary of Agriculture of the United States of America, and to his successors in office No Drawing. Application July 2, 1940, Serial No. 343,560

1 Claim. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects, without leaving a harmful residue on fruit and vegetables.

I have found that 1,4-diphenyl semicarbazide, $C_6H_5HN.HN.CO\ NHC_6H_5$ is effective in killing many species of insects whether applied externally or internally; that this organic product may be sprayed or dusted upon delicate vegetation without injuring it.

1,4-diphenyl semicarbazide is a colorless crystalline compound having a melting point of 176° C., is insoluble in water and ether, and soluble in acetone and in alcohol. The compound may be reduced to an impalpable powder by grinding and applied to vegetation either dry as a dusty or wet as a spray. The compound being somewhat soluble in refined mineral oils may be applied as a component of an oil emulsion spray.

The value of 1,4-diphenyl semicarbazide as an insecticide is shown by the following tests:

1. When tested by the apple-plug technique of Siegler (Jour. Ec. Ent., 27, 1140; 1934), 1,4-diphenyl semicarbazide gave 65.1 percent fruit free of worms.

2. When 6th instar southern armyworms were fed dusted collard leaves having a deposit of 1,4-diphenyl semicarbazide of 170 micrograms per square centimeter, the mortality was 83 percent in 48 hours.

3. At a concentration of 170 micrograms per square centimeter 1,4-diphenyl semicarbazide killed 100 percent of 5th instar southern beet webworm fed dusted squash leaves.

Having thus described my invention, what I claim for Letters Patent is:

An insecticide containing as its essential active ingredient 1,4-diphenyl semicarbazide.

ANDREW F. FREEMAN.